T. GALLOWAY & J. LARSEN.
Horse Hay Rake.
No. 229,530. Patented July 6, 1880.
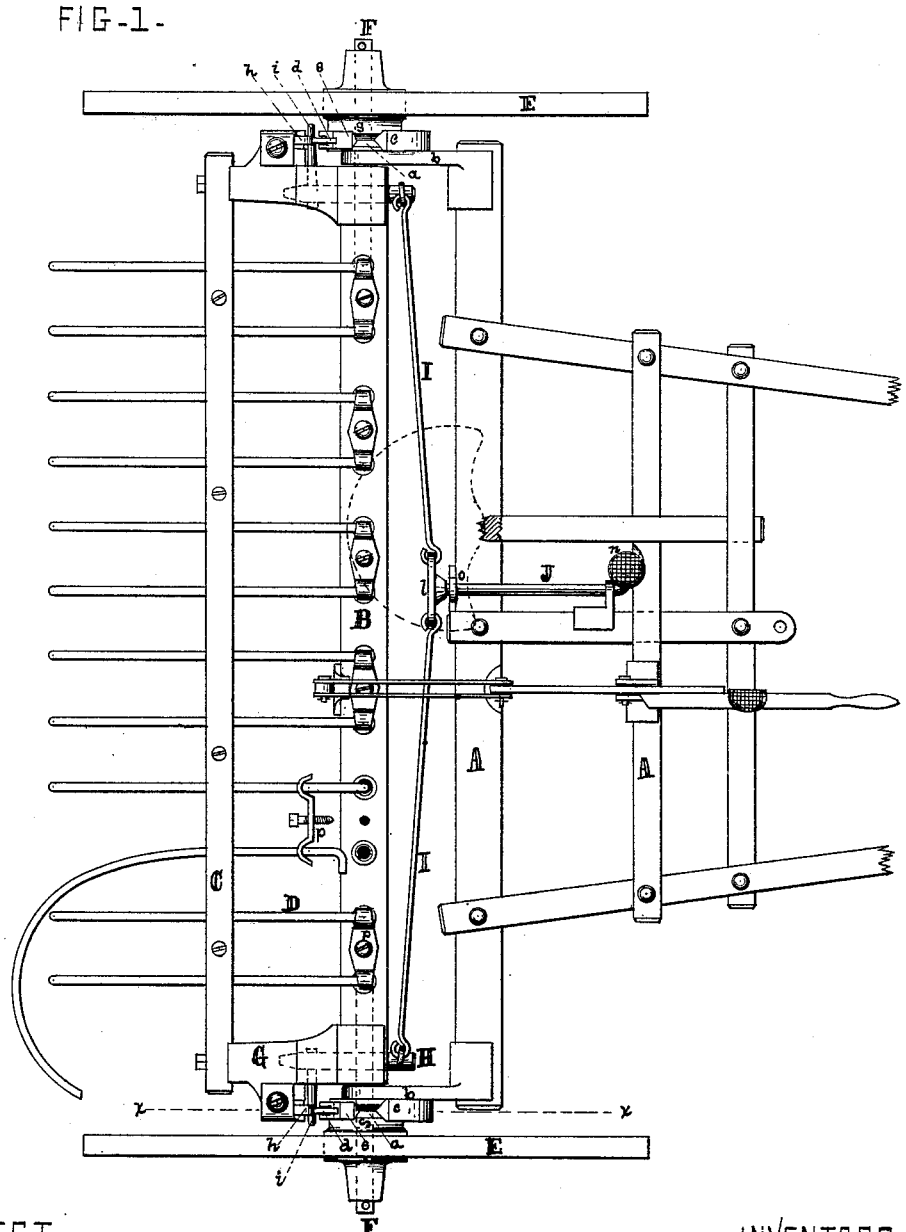
FIG-1-
ATTEST:
John G. Lane
John W. Steinman
INVENTORS
Thomas Galloway
John Larsen
By W. J. Lane, atty 2 Sheets—Sheet 2.
T. GALLOWAY & J. LARSEN.
Horse Hay Rake.
No. 229,530. Patented July 6, 1880.
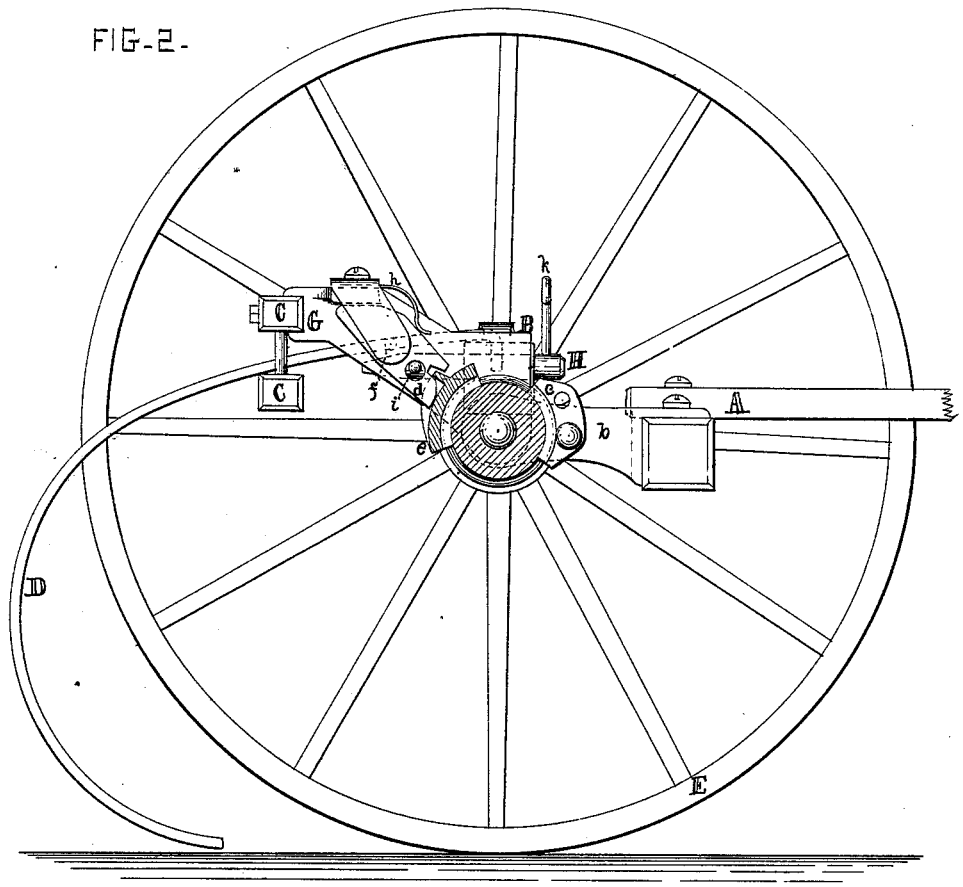
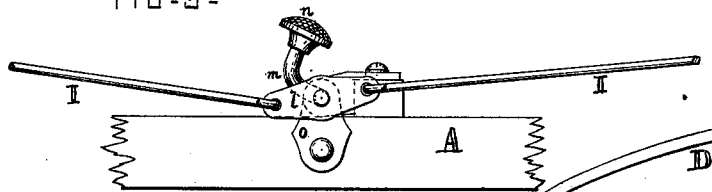
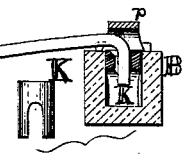
ATTEST:
John J. Lane
John W. Steinman
INVENTORS
Thomas Galloway
John Larsen
By W. J. Lane atty

UNITED STATES PATENT OFFICE.

THOMAS GALLOWAY AND JOHN LARSEN, OF OSHAWA, ONTARIO, CANADA, ASSIGNORS TO WILLIAM H. FIELD, OF PORT CHESTER, NEW YORK.

HORSE HAY-RAKE.

SPECIFICATION forming part of Letters Patent No. 229,530, dated July 6, 1880.

Application filed December 27, 1879. Patented in Canada March 5, 1877, and March 30, 1878.

*To all whom it may concern:*

Be it known that we, THOMAS GALLOWAY and JOHN LARSEN, of Oshawa, in the Province of Ontario and Dominion of Canada, have invented certain new and useful Improvements in Horse Hay-Rakes; and we do hereby declare that the following is a full, clear, and exact description of the invention, which will enable others skilled in the art to which it pertains to make and use the same, reference being had to the accompanying drawings, and to the letters of reference marked thereon, which form a part of this specification, in which similar letters of reference indicate like parts.

Figure 1 is a top view of our rake. Fig. 2 is a view showing the rake partly in side elevation and partly in vertical section. This section is taken in the line $xx$, Fig. 1. Fig. 3 is a rear view of the equalizer and discharging-lever. Fig. 4 is a view showing the tooth-holder in two different positions, at right angles to each other, one of them being in section through the center of the tooth-holder and across the head.

The nature of our invention consists in the arrangement, in combination with a rake-head, of a brake-shoe, in connection with mechanism whereby the forward motion of the carrying-wheel maintains between the shoe and the latter sufficient friction to discharge the load.

It also consists in connecting the discharging mechanism at the ends of the head directly, by means of tension members, with discharging mechanism attached to the shafts near the center of the rake.

It consists, further, in effecting the discharge by the use, attached to the shafts, of a torsional connecting-rod between the foot-pedal and tension members.

It also consists in employing an equalizer, in the manner hereinafter more fully set forth.

It further consists in the employment of a tubular tooth-holder having a portion of its length slotted to permit the free movement of the end of the tooth in one plane only.

It consists, also, in the employment of a fixed abutment attached to the shafts, against which the brake-shoe may strike, and thereby release the frictional bite fully or partially, as determined by the operator.

It finally consists in the particular construction and arrangement of certain mechanism, hereinafter more fully described.

In the accompanying drawings, A represents the shafts, B the head, C the guide-bar, D the teeth, E the wheels, and F the axles, being in respect to these parts essentially similar to other sulky-rakes.

The carrying-wheel E is provided with a hub, $s$, somewhat enlarged, which has a V-shaped groove, $a$, formed in it. Connected with the shafts at $b$ is a stationary abutment, $c$, which fits the groove $a$ loosely, and is held at the forward side of the hub $s$ by the arm $b$.

The axle F is rigidly secured to the wood head B, extending through the cast-iron arm $b$, which is bolted to the shafts, thus forming a hinge or joint between the shafts A and head B. To the rear of the head B extends an arm, G, which supports the guide-bar C. Upon the side of the arm G is pivoted a lever, $d$, one end of which fits a recess in the brake-shoe $e$.

The point at which this lever is pivoted is at $f$, and it will be seen that a straight line drawn from this point through the center of the axle F passes somewhat above the point where the lever $d$ comes in contact with the brake-shoe $e$. Hence when the brake-shoe is placed in contact with the wheel-hub moving forward, it is at once, by the action of the lever and forward motion of the wheel, pressed forcibly against the hub of the latter, locking the parts together and causing the head B to rotate with the wheel E until the shoe $e$ strikes the abutment $c$, when the friction is relieved and the shoe $e$ is thrown away from the surface of the hub $s$ by the spring $h$, and the teeth fall.

The lever $d$ is thrown upward by means of the bell-crank lever H, one arm of which is shown at $i$ and the other at $k$. To the arm $k$ is attached the tension-member I, the other end of the latter being connected to the arm $l$ of the torsion-rod J, to another arm, $m$, of which the pedal $n$ is attached.

Both ends of the head are similar in arrangement of mechanism, tension members connected with both ends being attached to either end of the arm $l$, and the torsion-rod J is pivoted to a link, $o$, whereby a lateral movement is allowed. This construction causes the pressure from the foot upon the pedal n to be transmitted equally by both tension members to the brake-shoes e, and equally well at all positions of the head.

The tooth-holder K is a metallic tube, the inside diameter of which is such as to admit the end of the tooth, and is slotted through its lower end in width equal to the diameter of the hole that receives the tooth.

The end of the tooth D is bent nearly at right angles downward. These tubular tooth-holders are driven in holes bored in the head B. The teeth are inserted and held in place by yokes p, each yoke embracing two teeth. The lower portion of the tooth-holder is slotted completely across, in order to give to the opposite sides some elasticity, and thus cause it to remain firmly fixed in the head under the changing conditions of swelling and shrinking of the wood, this elasticity being exerted against the end of the grain of the wood, or lengthwise of the head.

The operation of the rake is as follows: Upon moving forward with the machine, the operator presses his foot upon the pedal n, which pressure is transferred through the torsion-rod J, arm l, tension member I, bell-crank lever H, and lever d to the brake-shoe e, which, upon coming in contact with the hub s, locks the head B and wheel E together, causing the teeth to rise until the shoe e comes in contact with the abutment c, when the friction is relieved and the teeth drop back, unless the operator retains his foot upon the pedal n, in which case sufficient friction is maintained between the shoe e and hub s to carry the teeth in an elevated position so long as the foot is kept upon the pedal n.

As the point of bearing between the shoe e and the lever d is only slightly below a line drawn between the point f, at which the lever d is pivoted, and the center of the axle F, it follows that as soon as the brake-shoe e comes in contact with the revolving surface s the forward rotation of the latter increases the pressure of the brake-shoe e against said revolving surface in proportion to the resistance offered by the head and teeth against rotating, and no further pressure from the foot of the operator is required to dump the load after throwing the brake-shoe e in contact with the revolving surface, as before described.

This is a distinguishing feature of our invention, and combines the advantage of a positive locking of the rotating parts of a rake with the teeth while discharging with the ability to carry the teeth in an elevated position by means of the same devices by which they are elevated, being a positive clutch automatically maintained for elevating and a frictional sliding connection for carrying the teeth in an elevated position.

From the nature of the construction it will appear that as the forward movement of the wheel maintains the frictional pressure upon the shoe e a backward movement releases it, and therefore a pressure of the foot upon the pedal will not interfere with backing the rake; and also in turning around or driving the rake out of a straight line the wheel that moves the fastest discharges the load, while the opposite brake-shoe is nearly or quite released by the relatively backward movement of the other wheel.

What we claim is—

1. In a horse hay-rake, the combination of the head B and wheel or hub s with a brake-shoe arranged to be held or locked by the forward movement of the wheel against said hub by a toggle mechanism, the said shoe and the portion of the wheel between the shoe and the axle forming one arm of the toggle, and the link h the other, substantially as and for the purpose set forth.

2. A torsional discharge-rod constructed with arms m l, supported by the shafts and pivoted at the end next the tension members I I in a movable bearing, substantially as described.

3. A tooth-holder formed of one piece of metal, cylindrical in its external form and slotted completely through for a portion of its length, and adapted to be driven into a hole bored in the head, substantially as and for the purpose described.

4. The stationary abutment c, in combination with the brake-shoe e, substantially as set forth.

5. The combination of the shoe e, lever d, bell-crank H, and tension member I, substantially as described.

THOMAS GALLOWAY.
JOHN LARSEN.

Witnesses:
L. K. MURTON,
L. P. DREW.